US009727968B2

United States Patent
Habets et al.

(10) Patent No.: US 9,727,968 B2
(45) Date of Patent: Aug. 8, 2017

(54) TUBULAR STRUCTURE TRACKING

(71) Applicant: KONINKLIJKE PHILIPS N.V., Eindhoven (NL)

(72) Inventors: Raymond Joseph Elisabeth Habets, Eindhoven (NL); Jeroen Jozef Sonnemans, Herten (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/419,554

(22) PCT Filed: Aug. 12, 2013

(86) PCT No.: PCT/IB2013/056577
§ 371 (c)(1),
(2) Date: Feb. 4, 2015

(87) PCT Pub. No.: WO2014/027296
PCT Pub. Date: Feb. 20, 2014

(65) Prior Publication Data
US 2015/0213608 A1 Jul. 30, 2015

Related U.S. Application Data

(60) Provisional application No. 61/682,457, filed on Aug. 13, 2012.

(51) Int. Cl.
*G06K 9/00* (2006.01)
*G06T 7/00* (2017.01)
(Continued)

(52) U.S. Cl.
CPC ............. *G06T 7/0079* (2013.01); *G06K 9/00* (2013.01); *G06T 7/0012* (2013.01); *G06T 7/10* (2017.01);
(Continued)

(58) Field of Classification Search
CPC ......... G06T 2207/30101; G06T 7/0012; G06T 2207/10088; G06T 7/0083;
(Continued)

(56) References Cited

U.S. PATENT DOCUMENTS 6,496,188 B1  12/2002  Deschamps et al.
6,690,816 B2  2/2004  Aylward et al.
(Continued)

FOREIGN PATENT DOCUMENTS

WO  2005069228 A1  7/2005

OTHER PUBLICATIONS

Metz, C. et al., "Semi-Automatic Coronary Artery Centerline Extraction in Computed Tomography Angiography Data", Biomedical Imagining: From Nano to Macro, 2007. ISBI 2007, 4th IEEE International Symposium on, IEEE, P1 Apr. 1, 2007, pp. 856-859.
(Continued)

*Primary Examiner* — Vu Le
*Assistant Examiner* — Aklilu Woldemariam

(57) ABSTRACT

A method includes segmenting a tubular structure of interest in volumetric image data, thereby creating a tracking segmentation, visually presenting a user interactive three dimensional rending of the tracking segmentation, receiving a signal indicative of a user identified tracking path endpoint of interest in the tracking segmentation through the user interactive three dimensional rending, tracking the tubular structure in the tracking segmentation based on the signal, and visually presenting at least the tracked path through the tubular structure.

5 Claims, 4 Drawing Sheets

(51) Int. Cl.
G06T 15/08 (2011.01)
G06T 17/10 (2006.01)
G06T 19/00 (2011.01)
G06T 7/10 (2017.01)

(52) U.S. Cl.
CPC .............. *G06T 15/08* (2013.01); *G06T 17/10* (2013.01); *G06T 19/00* (2013.01); *G06T 2200/04* (2013.01); *G06T 2207/20101* (2013.01); *G06T 2207/20112* (2013.01); *G06T 2207/30004* (2013.01); *G06T 2207/30101* (2013.01); *G06T 2207/30172* (2013.01); *G06T 2210/41* (2013.01)

(58) Field of Classification Search
CPC . G06T 2207/30004; G06T 2207/30172; G06T 7/0079; G06T 7/0081; G06T 7/0042; G06T 17/00; G06T 15/08; G06T 2200/04; G06T 2207/20101; G06T 2207/20112; G06T 11/003; G06T 7/0085; A61B 8/0891; A61F 2250/0023; A61F 2250/0035; A61F 2250/0067; A61F 2/82; G06K 2209/051
USPC ....... 382/103, 128, 129, 130, 131, 134, 173, 382/209
See application file for complete search history.

(56) References Cited

U.S. PATENT DOCUMENTS

| | | | |
|---|---|---|---|
| 6,711,231 B2 | 3/2004 | Knoplioch et al. | |
| 6,842,638 B1* | 1/2005 | Suri ..................... | A61B 6/481 382/128 |
| 7,929,014 B2 | 4/2011 | Akimoto et al. | |
| 8,315,963 B2 | 11/2012 | Wiemker et al. | |
| 8,483,467 B2 | 7/2013 | Mizuno | |
| 9,037,215 B2 | 5/2015 | Higgins et al. | |
| 2004/0249270 A1* | 12/2004 | Kondo ................... | G06T 15/08 600/425 |
| 2005/0110791 A1* | 5/2005 | Krishnamoorthy ....... | G06T 7/60 345/419 |
| 2005/0143640 A1* | 6/2005 | Hoctor .................. | A61B 8/4236 600/407 |
| 2006/0079746 A1* | 4/2006 | Perret ................. | A61B 5/02007 600/407 |
| 2007/0116332 A1* | 5/2007 | Cai ....................... | G06K 9/4609 382/128 |
| 2007/0276223 A1* | 11/2007 | De Bliek ................ | G06T 11/00 600/410 |
| 2008/0094389 A1* | 4/2008 | Rouet ................... | G06K 9/0014 345/419 |
| 2008/0187199 A1 | 8/2008 | Gulsun et al. | |
| 2009/0185731 A1* | 7/2009 | Ray ....................... | G06T 7/0012 382/131 |
| 2010/0053160 A1* | 3/2010 | Arakita ................... | G06T 15/08 345/424 |
| 2010/0177177 A1* | 7/2010 | Sonnemans ........... | G06T 7/0012 348/61 |
| 2010/0239140 A1* | 9/2010 | Ruijters .................. | G06T 19/00 382/130 |
| 2011/0150274 A1* | 6/2011 | Patwardhan .......... | G06T 7/0012 382/103 |
| 2015/0131880 A1* | 5/2015 | Wang ..................... | G06T 3/0075 382/131 |
| 2015/0213608 A1 | 7/2015 | Habets et al. | |

OTHER PUBLICATIONS

Bescos, J.O. et al: "Vessel Explorer: a tool for quantitative measurements in CT and MR angiography", MEDICAMUNDI, vol. 53, No. 3, Jan. 1, 2009, pp. 64-71.

Egger, J., "Manual Refinement System for Graph-Based Segmentation Results in the Medical Domain", Journal of Medical Systems, Kluwer Academic Publishers—Plenum Publishers, NE, vol. 36, No. 5, Aug. 9, 2011, pp. 2829-2839.

Lesage, D. et al. "Bayesian Maximal Paths for Coronary Artery Segmentation from 3D CT Angiograms".

* cited by examiner

TUBULAR STRUCTURE TRACKING

CROSS-REFERENCE TO PRIOR APPLICATIONS

This application is the U.S. National Phase application under 35 U.S.C. §371 of International Application No. PCT/IB2013/056577, filed on Aug. 12, 2013, which claims the benefit of U.S. Provisional Application No. 61/682,457, filed on Aug. 13, 2012. These applications are hereby incorporated by reference herein.

The following generally relates to tracking a center (or other) line through a tubular structure of interest (e.g., a vessel, a bronchial tube, etc.) in imaging data while mitigating incomplete and/or incorrect paths. Suitable imaging modalities include computed tomography (CT), magnetic resonance (MR), and three-dimensional (3D) x-ray.

Vascular inspection in medical imaging generally entails looking for widened or obstructed regions of a vessel and/or a pulmonary embolism in the lung arteries in imaging data such as three-dimensional (3D) volumetric imaging data (e.g., computed tomography angiography (CTA), magnetic resonance angiography (MRA), 3D rotational x-ray, etc.). A goal is to measure local vessel parameters such as area and radius at several locations in an image to quantify the degree of stenosis or the size of an aneurysm.

Vessel visualization and analysis software has included tools that support vessel tracking along a path through the vessel center. With such software, the vessel centerline is defined using a fully automatic vessel segmentation algorithm or a manual or semi-automatic vessel centerline tracker. A tracked vessel typically is visualized using a maximum intensity projection (MIP) rendering, a surface volume rendering, a curved planar view, or a straightened reformatted view.

Fully automatic vessel tracking algorithms detect vessel objects in a predetermined region. The user then selects and/or edits the centerlines that are then used in the analysis. Semi-automatic path tracking can be split into single-point tracking approaches and two-point tracking approaches. Single point tracking involves user selection of a starting point and then the algorithm automatically traces the centerline. With two-point tracking, the user selects the starting point and an end point, and the algorithm automatically traces the centerline between the two points.

A disadvantage of single-point tracking is that the user has no control over the length of the tracked path or the vessel that is tracked. The algorithm just selects the mostly likely (largest/straightest) vessel. A solution to the "wrong" result (i.e., tracking a vessel and/or vessel length other then the desired vessel and/or vessel length) is re-tracking using a different start point. The "takes to long" problem can be solved by tracking a predefined length and then offering an option to extend or decrease the length.

Two-point tracking algorithms have the drawback that if the user places the two points too far apart or in different vessels, either the path result will be wrong or the computation time will be too long. In both cases, it can be cumbersome to arrive at the path the user wants to analyze. A solution is to require that a user first provide an initial segmentation of the vessels before tracking a centerline through them or moving the start and/or endpoints and trying again.

Unfortunately, the current solutions for the above noted and/or other shortcomings of the single-point and two-point tracking algorithms are cumbersome and not very intuitive as there is no guarantee that it will work the second, third, etc. iteration, and users typically spend a lot of time trying to visualize the vessel of interest and editing tracking results. In view of foregoing, there is an unresolved need for other approaches to tracking a vessel and/or mitigating at least the above-discussed shortcomings associated with current single and two-point tracking algorithms.

Aspects described herein address the above-referenced problems and others.

In one aspect, a method includes segmenting a tubular structure of interest in volumetric image data, thereby creating a tracking segmentation, visually presenting a user interactive three dimensional rending of the tracking segmentation, receiving a signal indicative of a user identified tracking path end point of interest in the tracking segmentation through the user interactive three dimensional rending, tracking the tubular structure in the tracking segmentation based on the signal, and visually presenting at least the tracked path through the tubular structure.

In another aspect, a computer readable storage medium encoded with computer readable instructions, which, when executed by a processer, causes the processor to: segment a tubular structure of interest in volumetric image data, thereby creating a tracking segmentation, visually present a user interactive three dimensional rending of the tracking segmentation, receive a signal indicative of a user identified tracking path end point of interest in the tracking segmentation through the user interactive three dimensional rending, track the tubular structure in the tracking segmentation based on the signal, and visually present at least the tracked path through the tubular structure.

In another aspect, a computing device includes a computer readable storage medium, which includes computer executable instructions for tracking a path through a tubular structure represented in a tracking segmentation from volumetric image data using a user interactive three dimensional rending of the tracking segmentation to mitigate at least one of an incomplete path or a incorrect path and visually presenting at least the tracked path through the tubular structure, and a processor which executes the computer executable instructions.

The invention may take form in various components and arrangements of components, and in various steps and arrangements of steps. The drawings are only for purposes of illustrating the preferred embodiments and are not to be construed as limiting the invention.

FIG. 1 schematically illustrates an example computing device with a tubular structure tracker.

The following describes a tubular structure tracker and/or tracking method that facilitates successful tracking of a center (or other) line through a tubular structure of interest (e.g., a vessel, a bronchial tube, etc. of a subject) along a longitudinal or long axis of the tubular structure, without any need for user tubular structure segmentation prior to and/or during tracking, while mitigating incomplete and/or incorrect paths.

Figure 1:
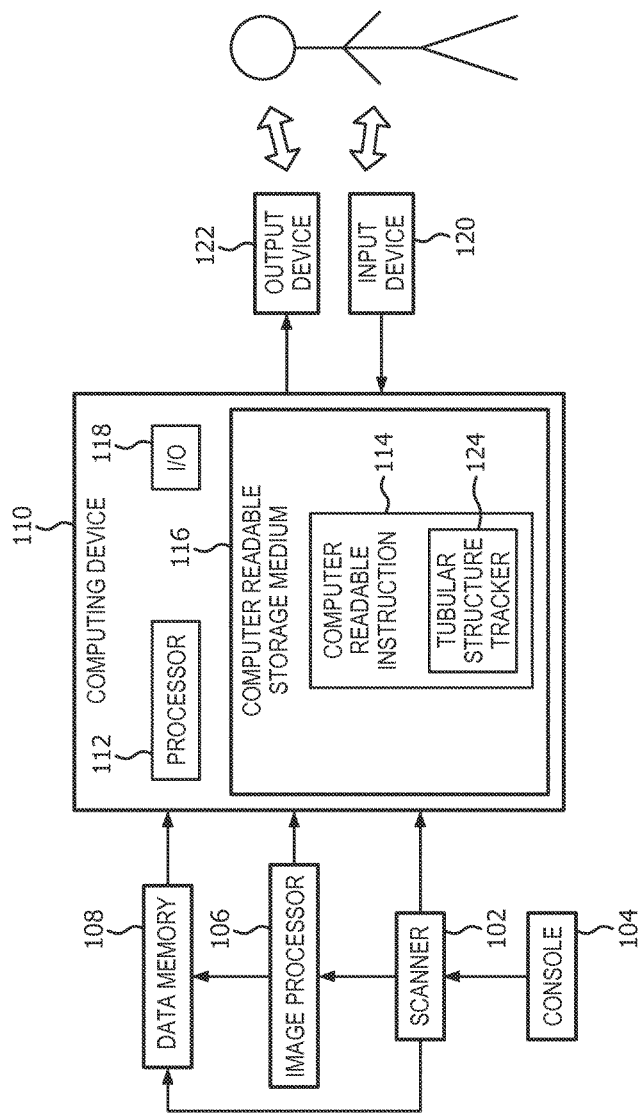

Initially referring to FIG. 1, a scanner 102 such as a CT, MR, x-ray, or other imaging scanner and/or a combination thereof is schematically illustrated. A console 104 includes a general-purpose computing system with a human readable output device such as a monitor and an input device such as a keyboard, mouse, etc. Software resident on the console 104 allows an operator to interact with the scanner 102, including initiating scanning, etc. An image processor 106 processes the output of the scanner 102 and generates imaging data (or images). The imaging data and/or scanner output can be stored in data memory 108. The imaging data and/or the scanner output data can be further processed and/or visually displayed.

A computing device 110 processes the imaging data and/or the scanner output. The illustrated computing device 110 includes at least one processor 112 that executes at least one computer readable instruction 114 stored in computer readable storage medium 116, such as physical memory or other non-transitory storage medium. Additionally or alternatively, the processor 112 executes one or more computer readable instructions carried by a carrier wave, a signal or other transitory medium. I/O 118 is configured for receiving information (e.g., tracking start and/or end points) from one or more input devices 120 (e.g., a keyboard, a mouse, touch screen monitor, and the like) and/or conveying information (e.g., a tracked path) to one or more output devices 122 (e.g., a monitor, a printer, portable memory, etc.).

The illustrated at least one computer readable instruction 114 at least includes instructions for implementing a tubular structure tracker 124. As described in greater detail below, the tubular structure tracker 124, when executed by the processor 112, facilitates tracking a path through a segmented tubular structure of interest (also referred to as a tracking segmentation herein) in imaging data using a user interactive intermediate three dimensional rendering, which mitigates incomplete and/or incorrect paths. For example, the user interactive intermediate three dimensional rendering allows selecting a tracking end point in the tracking segmentation and/or adjusting a location of a tracking start and/or end point in the tracking segmentation, which allows for successful tracking of the path without having to have the user segment the tubular structure prior to and/or during tracking.

Figure 2:
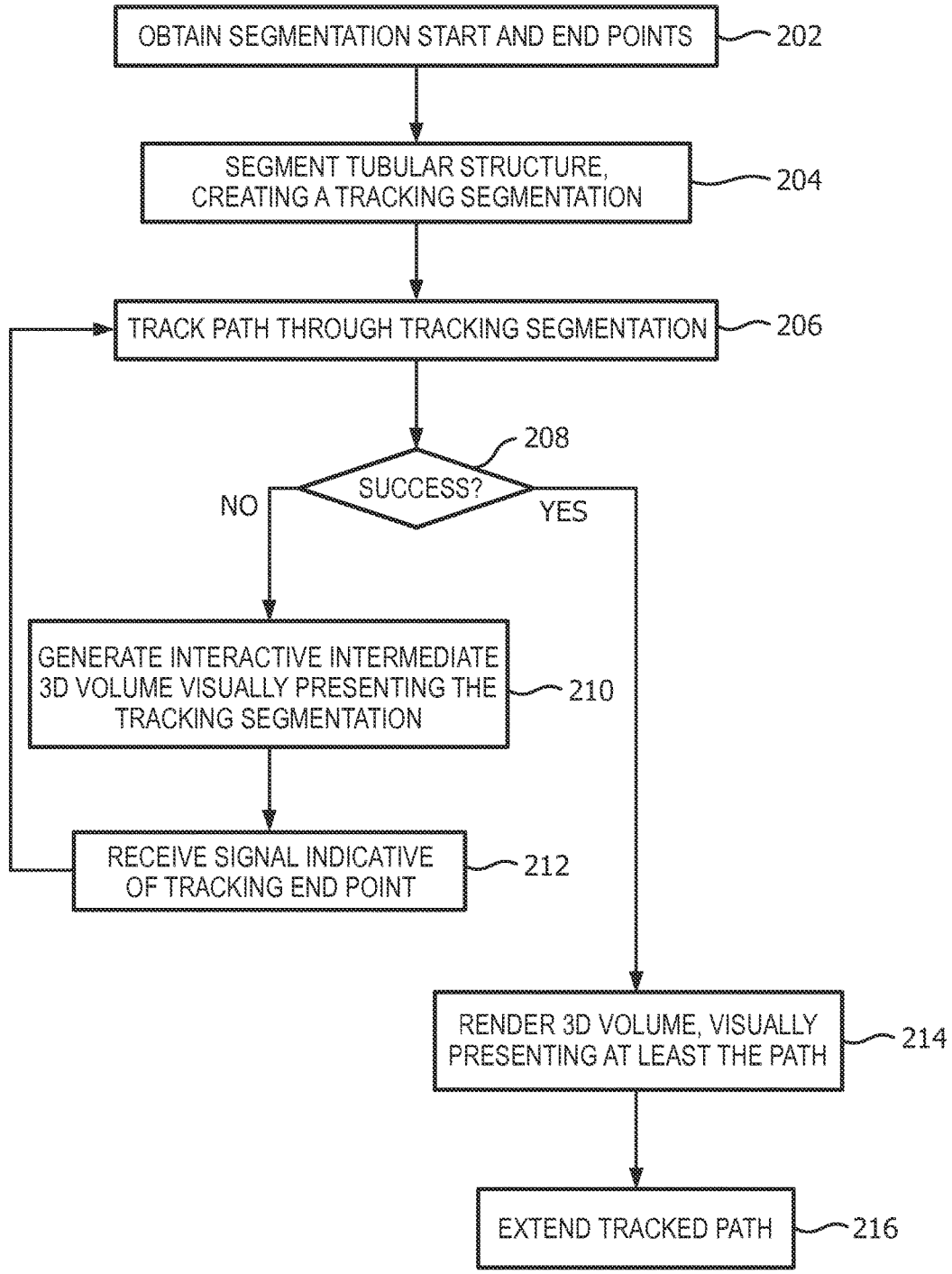
FIG. 2 illustrates an example multi-point uni-directional method for tracking a tubular structure.

FIG. 2 illustrates an example two-point uni-directional method for tracking.

It is to be appreciated that the ordering of the acts in the methods described herein is not limiting. As such, other orderings are contemplated herein. In addition, one or more acts may be omitted and/or one or more additional acts may be included.

At 202, segmentation start and end points for segmenting a tubular structure of interest represented in imaging data are obtained. As described herein, the imaging data can be generated by the scanner 102 and/or other scanner. The segmentation start and end points are identified via an input signal indicative of segmentation start and end points of interest such as start and end points entered or selected by a user via the input device 120.

At 204, the tubular structure is segmented from the imaging data based on the segmentation start and end points, creating a tracking segmentation.

At 206, a path is tracked through the tracking segmentation based on the segmentation start and end points.

At 208, it is determined whether tracking was successful. By way of example, if tracking has stopped and the end point has not been reached, tracking failed. However, if tracking has stopped and the end point has been reached, tracking succeeded.

If at 208 tracking failed, then at 210, a user interactive intermediate three-dimensional rendering of the tracking segmentation is visually presented. The rendering is interactive in that it allows a user using an input device 120 to identify a tracking end point in the tracking segmentation using a mouse, a voice command, a touch screen, etc.

At 212, an input signal indicative of a tracking end point is received. The signal may be generated in response to a user selecting a point in the tubular structure in the three-dimensional rendering. Generally, by selecting a point from the intermediate three-dimensional rendering in the tracking segmentation, the likelihood of successfully tracking a path through the tubular structure in a next iteration is guaranteed.

In response to receiving the tracking end point, act 206 is repeated based on the tracking end point, instead of the segmentation end point.

If at 208 tracking is successful, then at 214, a three-dimensional rendering of the tracked path in the tubular structure is visually presented. In a variation, other structure in the imaging data is concurrently rendered with the tracked path.

At optional act 216, the tracked path is extended by identifying a subsequent tracking end point in the tracking segmentation. The tracked path is then extended from the end point of the previous tracked path to the subsequent tracking end point.

Figure 3:
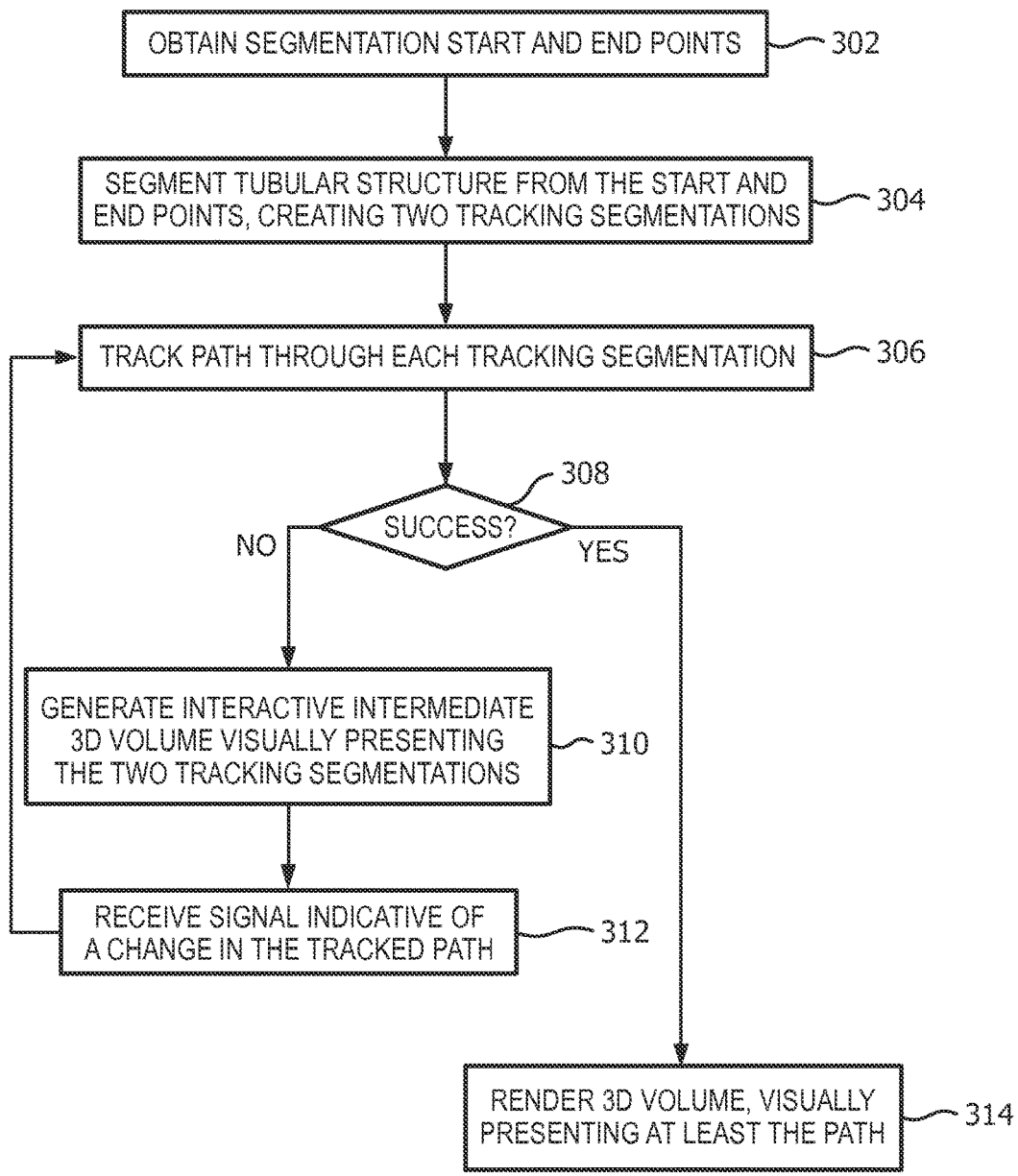
FIG. 3 illustrates an example multi-point bi-directional method for tracking a tubular structure.

FIG. 3 illustrates an example multi-point method for bi-directional tracking.

It is to be appreciated that the ordering of the acts in the method described herein is not limiting. As such, other orderings are contemplated herein. In addition, one or more acts may be omitted and/or one or more additional acts may be included.

At 302, segmentation start and end points for segmenting a tubular structure of interest represented in imaging data are obtained. As described herein, the segmentation start and end points are identified via an input signal indicative of the segmentation start and end points of interest such as start points entered or selected by a user via the input device 120.

At 304, the tubular structure is segmented from the imaging data based on the segmentation start and end points, creating two tracking segmentations, one beginning at the segmentation start point and one beginning at the segmentation end point.

At 306, paths are respectively tracked through each of the tracking segmentation based on the segmentation start and end points, with both progressing in a direction towards the other.

At 308, it is determined whether tracking was successful. By way of example, if tracking has stopped and two tracking segmentations do not meet to form a single path, tracking failed. However, if tracking has stopped and the two tracking segmentations meet to form a single path, tracking succeeded.

If at 308 tracking failed, then at 310, a user interactive intermediate three-dimensional rendering of the two tracking segmentations is visually presented. The rendering is interactive in that it allows a user using an input device 120 to move one or more of the segmentation start and/or end points using a mouse, a voice command, a touch screen, etc.

At 312, an input signal indicative of the segmentation end point change is received. In one instance, the change includes moving the end point of the tracking segmentation beginning with the segmentation start point, moving the start point of the tracking segmentation beginning with the segmentation end point, or connecting tracking segmentations together, for example, via interpolation or other approach.

In response to receiving the signal, act 306 is repeated based on the signal.

If at 308 tracking is successful, then at 314, a three-dimensional rendering of the tracked path in the tubular structure is visually presented. In a variation, other structure in the imaging data is concurrently rendered with the tracked path.

Figure 4:
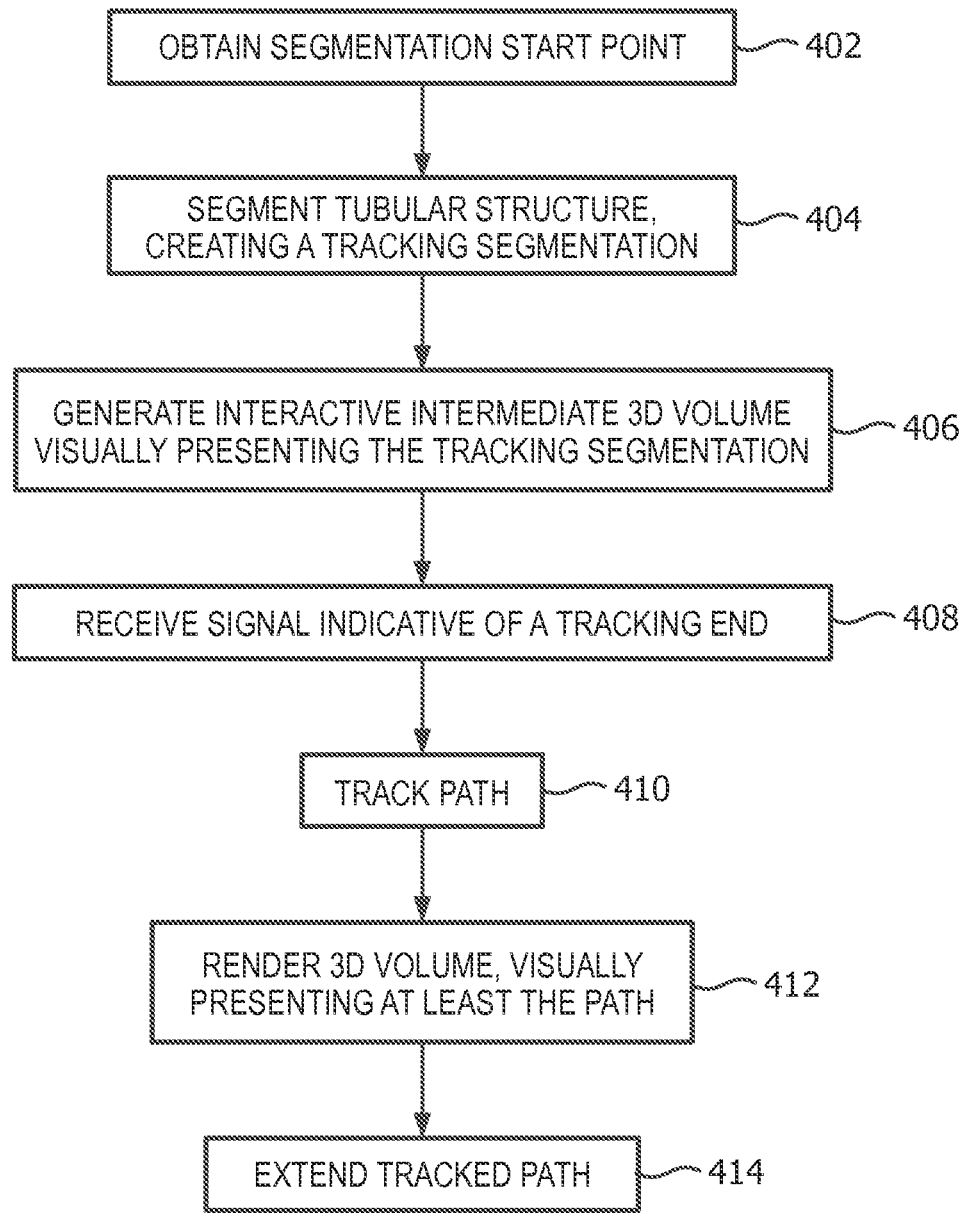
FIG. 4 illustrates an example single-point method for tracking a tubular structure.

FIG. 4 illustrates an example single-point method for tracking.

It is to be appreciated that the ordering of the acts in the methods described herein is not limiting. As such, other orderings are contemplated herein. In addition, one or more acts may be omitted and/or one or more additional acts may be included.

At 402, a segmentation start point is obtained as described herein.

At 404, the tubular structure is segmented from the imaging data based on the segmentation start point, creating a tracking segmentation.

At 406, a user interactive intermediate three-dimensional rendering of the tracking segmentation is visually presented. The rendering is interactive in that it allows a user using an input device 120 to identify a tracking end point in the tracking segmentation using a mouse, a voice command, a touch screen, etc.

At 408, an input signal indicative of a tracking end point in the tracking segmentation is received.

At 410, the path is tracked through the tubular structure in the tracking segmentation based on the tracking end point.

At 412, a three-dimensional rendering of the tracked path in the tubular structure is visually presented. In a variation, other structure in the imaging data is concurrently rendered with the tracked path. At optional act 414, the tracked path is extended by identifying a subsequent end point in the tracking segmentation. The tracked path is then extended from the end point of the previous tracked path to the subsequent end point.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method of determining a successful path through a tubular structure by a processor, comprising:
    tracking, by the processor, a tubular structure of interest in volumetric image data using a user selected start point and a user selected end point;
    determining, by the processor, whether a path is successful,
        wherein the path is successful when the path connects the start point and the end point forming a single path between the start point and end point; and
    when the path is successful, visually presenting, by the processor, the successful path to the user, and
    when the path is not successful, rendering, by the processor, tracked tubular structure into a three-dimensional and user-interactive visualization, receiving a user selected second end point, wherein the second end point is selected from a point on the rendered visualization; and
    extending, the processor, the path through the tubular structure to the second end point.

2. A non-transitory computer readable storage medium encoded with computer readable instructions, which, when executed by the processor, causes the processor to carry out the steps of the method of claim 1.

3. A computing device, comprising:
    a non-transitory computer readable storage medium of claim 1,
    wherein the processor executes the computer executable instructions with which the computer readable storage medium is encoded.

4. The method of claim 1, further comprising:
    determining, by the processor, whether the extended path is successful, wherein the path is successful when the path connects the start point and the second endpoint; and when the path is successful, virtually presenting, by the processor, the successful path to the user.

5. The method of claim 1, further comprising:
    after a successful path is visually presented to the user, lengthening, by the processor, the successful path using a user selected subsequent endpoint,
        wherein the subsequent endpoint is outside the successful path, and
        wherein the path is lengthened, by the processor, to the subsequent endpoint.

* * * * *